US012679614B2

(12) United States Patent
Bras et al.

(10) Patent No.: US 12,679,614 B2
(45) Date of Patent: Jul. 14, 2026

(54) RIGID BIODEGRADABLE FOOD CONTAINER

(71) Applicant: SOCIETE DES PRODUITS NESTLE S.A., Vevey (CH)

(72) Inventors: Julien Bras, St Martin d'uriage (FR); Agathe Mouren, La Seyne sur Mer (FR); Julia Chardot, Buc (FR); Karim Missoum, Pusignan (FR)

(73) Assignee: Societe des Produits Nestle S.A., Vevey (CH)

( * ) Notice: Subject to any disclaimer, the term of this patent is extended or adjusted under 35 U.S.C. 154(b) by 510 days.

(21) Appl. No.: 18/004,096

(22) PCT Filed: Jul. 6, 2021

(86) PCT No.: PCT/EP2021/068597
§ 371 (c)(1),
(2) Date: Jan. 3, 2023

(87) PCT Pub. No.: WO2022/008484
PCT Pub. Date: Jan. 13, 2022

(65) Prior Publication Data
US 2023/0257175 A1 Aug. 17, 2023

(30) Foreign Application Priority Data
Jul. 6, 2020 (EP) ..................................... 20184131

(51) Int. Cl.
*B65D 65/46* (2006.01)
*B32B 1/00* (2006.01)
(Continued)

(52) U.S. Cl.
CPC ............. *B65D 65/466* (2013.01); *B32B 1/00* (2013.01); *B32B 7/06* (2013.01); *B32B 9/02* (2013.01);
(Continued)

(58) Field of Classification Search
CPC .... B65D 65/466; B65D 1/0215; B65D 65/40; B65D 65/42; B65D 81/24;
(Continued)

(56) References Cited

U.S. PATENT DOCUMENTS

| | | | |
|---|---|---|---|
| 2016/0257098 A1* | 9/2016 | Nissenbaum | .............. C08J 5/18 |
| 2017/0107034 A1* | 4/2017 | Okamoto | ................. B65D 3/04 |
| 2018/0207917 A1 | 7/2018 | Patel | |

FOREIGN PATENT DOCUMENTS

| | | |
|---|---|---|
| EP | 3375593 | 9/2018 |
| WO | 0149770 | 7/2001 |

(Continued)

*Primary Examiner* — James C Yager
(74) *Attorney, Agent, or Firm* — K&L Gates LLP

(57) ABSTRACT

The present invention relates generally to the field of biodegradable food containers. In particular, the present invention relates to rigid food containers comprising at least one layer comprising polyhydroxyalkanoate (PHA) and another layer comprising cellulosic fibres. For example, the food container may be a food bottle. One embodiment of the present invention relates to a rigid biodegradable food container comprising an inner container comprising at least one PHA biodegradable polymer and an outer container comprising cellulose.

13 Claims, 3 Drawing Sheets

Mold

Film

Cellulose substrate

(51) Int. Cl.

| | |
|---|---|
| B32B 7/06 | (2019.01) |
| B32B 9/02 | (2006.01) |
| B32B 9/04 | (2006.01) |
| B32B 21/02 | (2006.01) |
| B32B 21/08 | (2006.01) |
| B32B 27/08 | (2006.01) |
| B32B 27/10 | (2006.01) |
| B32B 27/36 | (2006.01) |
| B65D 1/02 | (2006.01) |
| B65D 65/40 | (2006.01) |
| B65D 65/42 | (2006.01) |
| B65D 81/24 | (2006.01) |

(52) U.S. Cl.
CPC .............. *B32B 9/045* (2013.01); *B32B 21/02* (2013.01); *B32B 21/08* (2013.01); *B32B 27/08* (2013.01); *B32B 27/10* (2013.01); *B32B 27/36* (2013.01); *B65D 1/0215* (2013.01); *B65D 65/40* (2013.01); *B65D 65/42* (2013.01); *B65D 81/24* (2013.01); *B32B 2307/7163* (2013.01); *B32B 2307/7246* (2013.01); *B32B 2307/7376* (2023.05); *B32B 2307/738* (2013.01); *B32B 2439/60* (2013.01); *B32B 2439/62* (2013.01); *B32B 2439/70* (2013.01); *B65D 2565/385* (2013.01); *B65D 2565/387* (2013.01)

(58) Field of Classification Search
CPC ........ B65D 2565/385; B65D 2565/387; B32B 1/00; B32B 7/06; B32B 9/02; B32B 9/045; B32B 21/02; B32B 21/08; B32B 27/08; B32B 27/10; B32B 27/36; B32B 2307/7163; B32B 2307/7246; B32B 2307/7376; B32B 2307/738; B32B 2439/60; B32B 2439/62; B32B 2439/70; B32B 2262/062; B32B 2262/065; B32B 2262/067; B32B 2270/00; B32B 29/002; B32B 7/12; B32B 2307/732; B32B 2439/06; B32B 2439/46; Y02A 40/90; Y02W 90/10
See application file for complete search history.

(56) References Cited

FOREIGN PATENT DOCUMENTS

| | | |
|---|---|---|
| WO | 0194697 | 12/2001 |
| WO | 2010037906 | 4/2010 |
| WO | 2020017968 | 1/2020 |

* cited by examiner

RIGID BIODEGRADABLE FOOD CONTAINER

CROSS REFERENCE TO RELATED APPLICATIONS

The present application is a National Stage of International Application No. PCT/EP2021/068597, filed on Jul. 6, 2021, which claims priority to European Patent Application No. 20184131.9, filed on Jul. 6, 2020, the entire contents of which are being incorporated herein by reference.

The present invention relates generally to the field of biodegradable food containers. In particular, the present invention relates to rigid food containers comprising at least one layer comprising polyhydroxyalkanoate (PHA) and another layer comprising cellulosic fibres. For example, the food container may be a food bottle. One embodiment of the present invention relates to a rigid biodegradable food container comprising an inner container comprising at least one PHA biodegradable polymer and an outer container comprising cellulose.

Packaging of manufactured food products is a vital part of the food industry today as it ensures food safety, preserves food quality and plays an important role in production processes, in brand communication and in digitalization. Indeed, several studies show that for a large part of consumers the packaging of a product is one key aspect that drives the purchase decision.

One of the main problems associated with packaging in general is the generation of packaging waste. According to Eurostat in 2017, 172.6 kg of packaging waste was generated per inhabitant in the EU.

The industry addresses this issue by embracing the circular economy. In line with this, the European Commission has recently communicated a new Circular Economy Action Plan (COMMUNICATION FROM THE COMMISSION TO THE EUROPEAN PARLIAMENT, THE COUNCIL, THE EUROPEAN ECONOMIC AND SOCIAL COMMITTEE AND THE COMMITTEE OF THE REGIONS A new Circular Economy Action Plan For a cleaner and more competitive Europe, Brussels, Nov. 3, 2020). Accordingly, the EU needs to accelerate the transition towards a regenerative growth model that gives back to the planet more than it takes, advance towards keeping its resource consumption within planetary boundaries, and therefore strive to reduce its consumption footprint and double its circular material use rate in the coming decade.

One step towards achieving this is to provide sustainable food packaging. Such sustainability can be achieved by biodegradable food packaging.

Packaging of food products is challenging as food packaging needs to ensure food safety, preserve food quality and ensure safe storage and handling. Food packaging can also contribute to an extended shelf life. Consequently, food packaging also plays a key role in avoiding food waste. If food products are liquid in nature, packaging is challenging as the liquid food product should not penetrate the packaging. To avoid this, typically liquid food products are provided in bottles, cans, pouches, or cartons usually made from plastics, composite paper-based materials, metal, or glass.

As liquid food products are easy to consume, also out-of-home, this market is expected to still grow significantly with the risk that packing material increasingly ends up in nature.

Consequently, there is a continuous need for further recyclable food containers that can be used for liquid food products. Here, the paper recycling stream for paper-based materials might be an interesting alternative solution to the classic mechanical recycling of plastics, such as PET.

In this respect EP 3 375 593 B1 relates to containers for liquid goods, said containers involving thermoplastic inner liner, for example a blow molded inner liner, and a fibre based shell. Combining a fibre-based shell with a thermoplastic inner liner makes it possible to produce packaging with an increased amount of recyclable material, here the fibre-based shell, and reduced amounts of plastic. However, such a structure might not be sufficient to allow recyclability in a paper stream.

It would still be desirable to have available further food containers that can be also used for liquid food products and that are recyclable and/or biodegradable. In particular, it would be desirable, if the food container contained as little plastic as possible, e.g., to improve its recyclability in the paper stream.

Any reference to prior art documents in this specification is not to be considered an admission that such prior art is widely known or forms part of the common general knowledge in the field.

The objective of the present invention was it, hence, to improve and/or enrich the state of the art and in particular to provide a food container that is biodegradable, contains as little plastic as possible, can be used for liquid food products and can be hand held without deformation of the container, or to at least provide a useful alternative to rigid recyclable and/or biodegradable food containers existing today.

The inventors were surprised to see that the objective of the present invention could be achieved by the subject matter of the independent claim. The dependent claims further develop the idea of the present invention.

Accordingly, the present invention provides a rigid biodegradable food container comprising at least one layer comprising polyhydroxyalkanoate (PHA) and another layer comprising cellulosic fibres.

For example, the food container may be a food bottle comprising an inner container comprising at least one PHA and an outer container comprising cellulose.

As used in this specification, the words "comprises", "comprising", and similar words, are not to be interpreted in an exclusive or exhaustive sense. In other words, they are intended to mean "including, but not limited to".

The present inventors have shown that the rigid biodegradable food container in accordance with the present invention allows it to achieve the objective of the present invention. In particular, the combination of a cellulose containing container wall with a PHA containing layer allows it to reduce the amount of plastics used in the food packaging as the stability is provided by the cellulose content. This improves the recyclability of the food container described in the present invention in the paper stream. The use of PHA allows it that the plastic component is biodegradable. Furthermore, the use of PHA allows it to meet the specific requirements different food products may have as PHAs have very diverse structural varieties, resulting in variable melting temperatures ($T_m$), and glass-transition temperatures ($T_g$), for example. The food container of the present invention can allow it that the PHA containing layer is separated from the cellulose containing layer, so that a part of the food container can be recycled and/or biodegraded and a part of the food container can be re-used and/or recycled and/or biodegraded. The architecture of the food container of the present invention allows it to ensure water-proofness. A further advantage of the food container of the present invention is that it can be manufactured by different methods. For example, a PHA containing film may be thermoformed inside a hollow cellulose containing shell and the shell can be—but does not have to be—assembled. Alternatively, a PHA containing suspension and/or emulsion may be spray-coated onto the inside of the cellulose containing shell.

Figure 1:
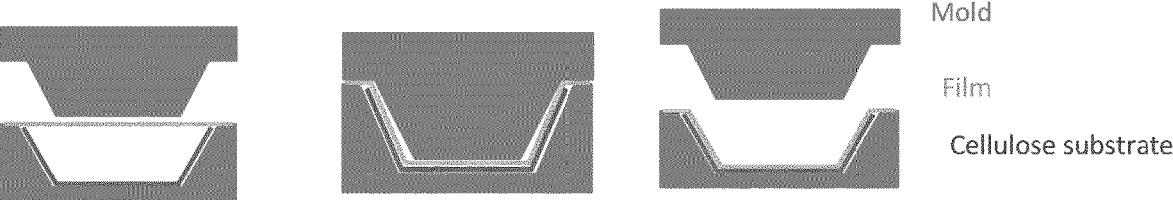
FIG. 1 shows the thermoforming process via thermopressing.

Consequently, the present invention relates in part to a rigid biodegradable food container comprising at least one layer comprising at least one polyhydroxyalkanoate (PHA) and another layer comprising cellulosic fibres.

For the purpose of the present invention the term "rigid" food container shall mean a food container which will not be bend or be forced out of shape when it is held by hand. For example, a rigid food container may be a food container that is not flexible. Flexible food containers may be food containers that can be readily shaped or changed in form without breaking or cracking upon the application of pressure.

According to the European Commission under reference to Pure Applied Chemistry 84 (2), pp. 377-410, biodegradability is understood as the capability of the material to be converted into $CO_2$ under the action of micro-organisms. This property may be measured with a laboratory standard test method: the EN 14046 (also published as ISO 14855: biodegradability under controlled composting conditions). In order to show complete biodegradability, a biodegradation level of at least 90% must be reached in less than 6 months. The norm EN 13432 is a harmonized norm.

The food container in accordance with the present invention is biodegradable.

The food container in accordance with the present invention may be recyclable.

A material can be considered recyclable, if it can be subjected to recycling. According to the DIRECTIVE 2008/98/EC OF THE EUROPEAN PARLIAMENT AND OF THE COUNCIL 'recycling' means any recovery operation by which waste materials are reprocessed into products, materials or substances whether for the original or other purposes. It includes the reprocessing of organic material but does not include energy recovery and the reprocessing into materials that are to be used as fuels or for backfilling operations. Several recycled material streams are well established and according to the previous definition and the knowledge of the state of the art in paper recycling, the food container of the present invention may be recyclable in the paper stream.

According to Codex Alimentarius, food means any substance, whether processed, semi-processed or raw, which is intended for human consumption, and includes drink, chewing gum and any substance which has been used in the manufacture, preparation or treatment of "food" but does not include cosmetics or tobacco or substances used only as drugs.

The container may be any container that can be used to package food. For example, the food container in accordance with the present invention may have the shape of a bottle, a jar, a carton or a pouch, for example. In one embodiment, the food container in accordance with the present invention may resemble or be a bottle. According to the Cambridge English Dictionary a bottle may be container for liquids with a narrow neck. The bottle may be a rigid or semirigid container.

The use of at least one PHA has the advantage that PHAs were found to be less brittle than other biodegradable plastics. Different PHAs or combinations of different PHAs may be used. Advantageously, diverse structural varieties can be achieved by selecting PHAs appropriately making use, for example, of their variable melting temperatures and glass-transition temperatures. Further, PHAs are biodegradable. Recent reports state that PHAs are not only biodegradable in industrial composting equipment, but also in the soil and in freshwater and seawater. Several different PHAs are available today and continue to be developed. eXPRESS Polymer Letters Vol. 8, No. 11 (2014) 791-808 reviews PHAs, their synthesis, characteristics, processing and potential applications in packaging.

Cellulose is a compound with the formula $(C_6H_{10}O_5)_n$, a polysaccharide containing a chain of $\beta(1\rightarrow4)$ linked D-glucose units. Cellulose is an important structural component of the primary cell wall of plants, many forms of algae and oomycetes.

The use of cellulosic fibres has the advantage that cellulose is the world's most abundant organic polymer and, hence, occurs frequently in nature, does not require chemical synthesis and can be regrown sustainably in nature. Microorganisms in the soil are able to degrade cellulose efficiently, making it, for example, useful as compost.

In one embodiment of the present invention the rigid biodegradable food container may comprise an inner container and an outer container. The inner container may comprise at least one PHA and/or the outer container may comprise cellulose. The PHA may be selected from the group consisting of PHBH, PHB, PHBV, PHV or combinations thereof. Hence, the rigid biodegradable food container in accordance with the present invention may comprise an inner container comprising at least one PHA and an outer container comprising cellulose. Advantageously, the inner container can be separated from the outer container, for example, after use. This would allow separate recycling and/or biodegradation of inner and outer container.

If the food container of the present invention comprises an inner container comprising at least one PHA and an outer container comprising cellulose, this has the advantage the outer container provides the required stability of the packaging, whereas the inner container provides a substantial part of or all the required barrier properties. This has the advantage that a lot of plastic packaging material can be saved as the PHA containing layer does not have to provide the required stability and, hence a thinner PHA layer can be used.

The inner container may also comprise other biodegradable compounds. This can be beneficial, if these other biodegradable compounds can be used to impart specific properties to the inner container that the at least PHA alone does not provide. For example, the inner container may comprise other polymers or may be a copolymer. The inner container may also be a laminate material comprising different biodegradable compounds, such as biodegradable polymers, for example. Accordingly, in the rigid biodegradable food container in accordance with the present invention, the inner container may further comprise at least one biodegradable polymer selected from the group consisting of poly(lactic acid) (PLA), poly(hydroxyalkanoates) (PHAs), polycaprolactone (PCL), poly(butylene succinate) (PBS), poly(butylene adipate-co-terephthalate) (PBAT), or combinations thereof.

The inventors have obtained particularly promising results with a prototype of the food container in accordance with the present invention with an inner container comprising PHBH and PBS.

The inner container may have a wall thickness in the range of about 20 to 250 µm, of about 20 to 150 µm, of about 20 to 100 µm, or of about 20 to 75 µm. As discussed, the stability of the outer container allows it to reduce the wall thickness of the inner container remarkably.

In one embodiment of the present invention, the inner container provides an essential part of or all the barrier properties of the food container. For example, the inner container may have a water vapor transmission rate (WVTR) in the range of about less than 50 g/(m²×24 h), less than 8 g/(m²×24 h), or less than 5 g/(m²×24 h). The WVTR may be measured at 23° C., at a RH of 85%. For example, it may be measured in accordance with ISO 2528:1995, herein incorporated in its entirety by reference.

Alternatively or additionally, the inner container may have a daily water uptake in the range of about less than 50 g/m²/month. The water repellency may be measured by weighting the water uptake of a sample in regular time laps between 1 h and several days.

The food container in accordance with the present invention may have any volume that is used for food products. For example, the food container may have a volume that allows it to package single servings. It may also have a size that allows it to contain multiple servings. Hence, the food container in accordance with the present invention may be intended to contain food products to be consumed in-home or out-of-home.

For example, the food container or the inner container may have a volume in the range of about 100 ml to 5 l, 200 ml to 2.5 l, 250 ml to 2 l or 300 ml to 1 l. If the food container is intended to contain a single serving it may be preferred if the inner container has a volume in the range of about 50 ml-500 ml, 100 ml to 400 ml, or 10 ml to 330 ml. If the food container is intended to contain multiple servings, it may be preferred if the inner container has a volume in the range of about 500 ml-5000 ml, 750 ml to 3000 ml, or 1000 ml to 2000 ml.

The outer container may contain cellulose in any form that allows to impart sufficient stability to the outer container. For example, the outer container may comprise cellulose containing fibres, for example selected from the group consisting of wood fibers, sugar can fibres, bamboo fibres, annual crop fibers or fibres from recycled paper or cardboard material.

Cellulose has the advantage that it is a resource that can be regenerated. Using cellulose from recycled cellulose containing material has the advantage that an attractive new use of previously used cellulose based materials is generated.

The outer container of the food container in accordance with the present invention may contain cellulose. For example, it may contain at least about 50 weight-%, at least about 60 weight-%, at least about 70 weight-%, at least about 80 weight-%, at least about 90 weight-%, at least about 95 weight-%, or at least about 99 weight-% cellulose. In one embodiment of the present invention, the outer container may consist of cellulose.

Using a high cellulose content has the advantage that a large part of the packaging is produced from renewable resources.

The outer container may further comprise compounds selected from the group consisting of nano/microfibrillated cellulose, known sizing agents such as AKD & ASA, biodegradable polymeric fibers, any biobased polymer coating like cellulose derivatives or cationic starch, or combinations thereof.

The inventors have obtained particularly promising results with a prototype of the food container in accordance with the present invention an outer container comprising a hardwood and/or a softwood mixture.

The outer container should have a sufficient thickness that the outer container provides enough stability to the food container in accordance with the present invention. The inventors were surprised to see that this could be achieved with relatively thin walls of the outer container. For example, the outer container may have a wall thickness in the range of about 0.5 to 2 mm, of about 0.5 to 1.5 mm, or of about 0.5 to 1 mm.

In one embodiment of the food container of the present invention the inner container is reversibly attached to the outer container. In a further embodiment of the present invention, the inner container is not attached to the outer container. This has the advantage that the inner container can be recycled and/or biodegraded separately from the outer container.

For example, the outer container may be provided in a form that it can be opened, so that the inner container can be separated more easily.

The outer container may also be provided in a form that it can be opened and reclosed, so that the inner container can be removed and replaced by a second inner container filled with a food product, This would allow that the outer container is re-used, while the inner container is discarded after use and replaced by a new inner container filled with a food product.

Hence, in one embodiment of the food container of the present invention the inner container can be exchanged while the outer container is re-used. For example, the outer container can be opened and re-closed. This may be achieved, for example, by a clip-and-close mechanism.

For some uses it might also be preferable, if the inner container is attached to the outer container. For example, the inner container may be laminated to the outer container. This has the advantage that the inner container will not move against the outer container, for example, during transport, avoiding the risk that the barrier properties of the inner container are impaired, due to mechanical stress. Further, as inner and outer container are biodegradable, the food container may be subjected to biodegradation as a whole.

If the inner container is laminated onto the outer container, this can be achieved by thermopressing the inner container against the outer container. Hence, the lamination may be carried out by a process comprising the steps of heating the inner container in contact with the outer container and pressing the inner container against the outer container. Thermopressing is well known in the art. Thermopressing can be carried out on conventional equipment using commonly used techniques. It is well-known that overheating of PHAs should be avoided. The inventors have obtained best results using a slow draw rate of 200% at a stretching speed of 200 mm/min.

If the inner container is laminated onto the outer container, this can be achieved by thermoforming of the inner container against the outer container. Hence, the lamination may be carried out by a process comprising the steps of heating the inner container in contact with the outer container, insulate air in order to form a bubble and pre-extend the film and finally to apply a vacuum. This allows the film to adapt perfectly to the form of the outer container. Thermoforming is well known in the art. Thermoforming can be carried out on conventional equipment using commonly used techniques. It is well-known that overheating of PHAs should be avoided. The inventors have obtained best results using a slow draw rate 200% and a stretching speed of up to 250 mm/sec.

Alternatively, the inner container may be spray-coated onto the outer container. This can be achieved, for example, by a process comprising the steps of preparing a liquid composition comprising at least one PHA with a viscosity in the range of standard viscosities for spray coating applications, for example of about, spraying the liquid composition homogenously onto the outer container, and curing the liquid composition to form the inner container.

The liquid composition may be an emulsion or a dispersion, for example.

The curing step can be carried out by applying heat and/or FTIR, for example. Good results can be obtained if the liquid composition is cured after application by subjecting it to a temperature in the range of about 30° C. to 250° C. for a time in the range of about 1 to 120 minutes. The container is sprayed at least once. Deposited thickness can vary from 0.1 µm to 1000 µm.

Using a liquid composition that is then spray coated onto the inner container has the advantage that a better compatibilization/penetration between the cellulose containing outer container and the PHA containing inner container will be achieved and the delamination risk between the outer container and the inner container is eliminated. Another advantage is that the coating can be easily applied on 3D closed hollow shapes. Furthermore, coated cellulosic fibres are easier to recycle in comparison with laminates.

In one embodiment of the food container of the present invention the inner container comprises 100% PHAs, and the outer container comprises 100% cellulose.

If the food container is a bottle, a particular critical part of the bottle is the neck of the bottle, as it is frequently subjected to mechanical stress during manufacturing, transport and/or handling. In addition, the bottle neck and the bottle cap need to form a watertight structure to ensure proper bottle sealing. The inventors have obtained particular good results, if the bottle neck comprised at least one PHA, and the stability of the bottle neck is provided by a PHA containing structural element.

Hence, the neck of the food bottle may comprise or consist of at least one PHA. The bottle neck may be clipped or sealed to the inner container of the food bottle, for example above the shoulder of the bottle.

The sealing of the inner container to the PHA containing bottle neck may then be achieved by infra-red, ultrasound or thermo sealing.

Accordingly, in one embodiment of the present invention the food container is a food bottle and the neck of the food bottle comprises at least one PHA. In a further embodiment of the present invention, the food container is a food bottle and the neck of the food bottle consists of at least one PHA.

Those skilled in the art will understand that they can freely combine all features of the present invention disclosed herein. In particular, features described for the product of the present invention may be combined with the use of the present invention and vice versa. Further, features described for different embodiments of the present invention may be combined.

Although the invention has been described by way of example, it should be appreciated that variations and modifications may be made without departing from the scope of the invention as defined in the claims.

Furthermore, where known equivalents exist to specific features, such equivalents are incorporated as if specifically referred in this specification. Further advantages and features of the present invention are apparent from the figures and non-limiting examples.

EXAMPLES

1) Spray Coating

The spray coating trials were performed with a Wiltec HVLP spray gun reference 827A1, 1.4 mm nozzle and a PHA emulsion.

The spray gun is connected to compressed air, pressure is set to 4 bars.

The emulsion is diluted with water when required in order to achieve targeted viscosity.

After the dilution, in order to prevent bubble formations during the application, the excess in air is removed from the solutions. This is done via vacuum application on the solution.

It is then carefully transferred into the liquid holding vessel of the spray gun.

The liquid is homogenously sprayed onto the substrates surface. Achieved coat weights are usually in the range a few 200 gsm.

Drying is then performed in an oven in order to achieve the film forming and coalescence of the emulsion particles. The ovens temperature is increased gradually, minute per minutes from RT until 170° C. to allow the film formation.

Achieved coating is crack-less. Water resistance is good and water-uptake limited 2) Thermoforming The thermoforming trials were preformed on a standard thermoforming equipment type Formtech 686.

Figure 2:
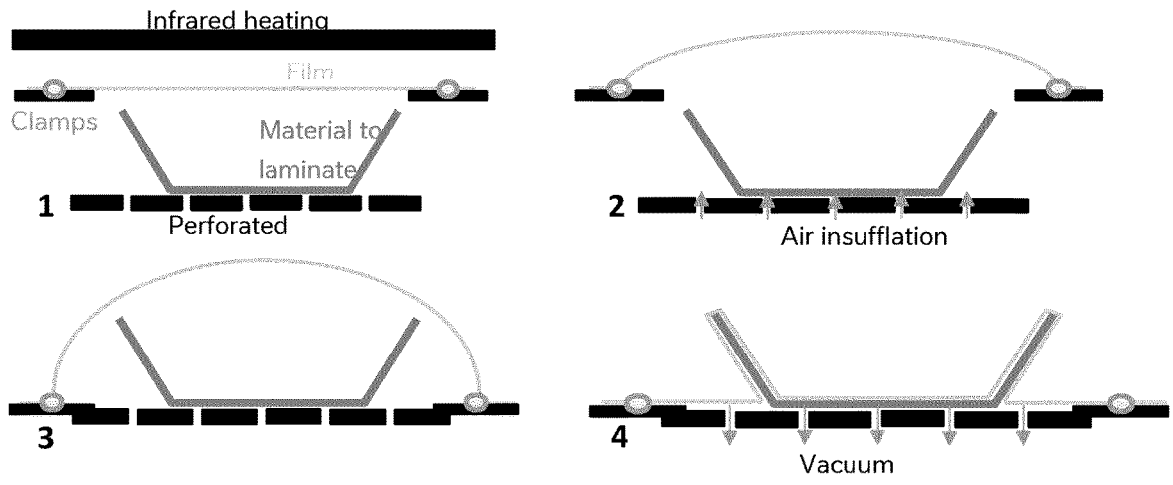
FIG. 2 shows the thermoforming process with a thermoforming lamination technology also called skin vacuum lamination.
Figure 3:
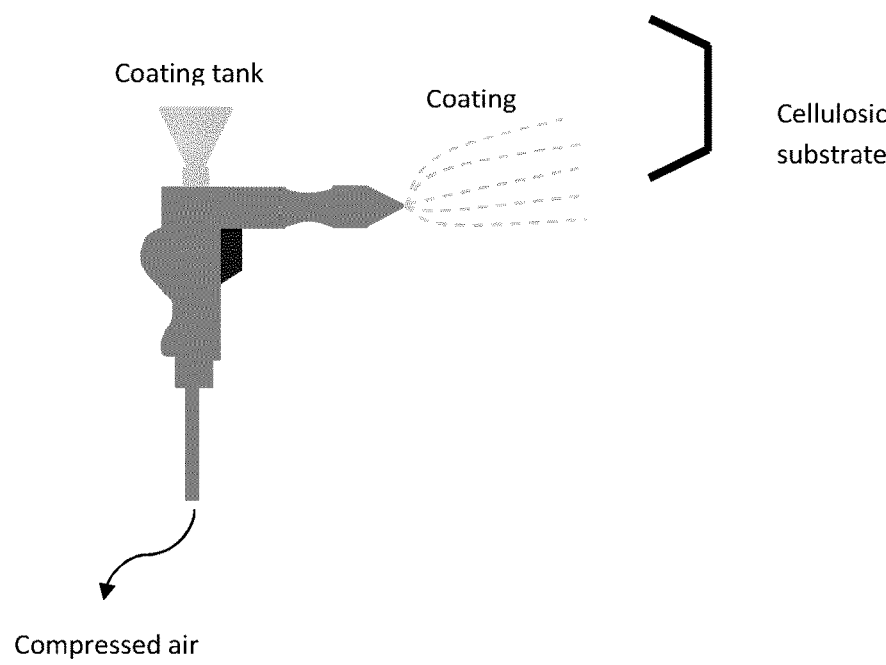
FIG. 3 shows the spray coating process.

The molded substrate is placed on a perforated plate. The 150 µm PHBH+PBS film is clamped above the plate and heated with infrared platen as shown in FIG. 2. The film should be heated in order to obtain a temperature above glass transition temperature of the film material so above 113° C. The temperature is adapted by adapting the power of the infrared plates. In this case they were heated at 70% during 8 seconds. A bubble is created with air blowing below the film through the perforation of the plates. The film is pre-stretched allowing a better deformation onto the deeper surfaces once vacuum is applied. This step is not always needed and was not performed in this case.

The perforated plates with the substrate are moved up to the film. Vacuum is then applied through the perforations of the plates. A second heating with 70% power and during 8 seconds is done during the vacuum application The film is sucked through the porosity of molded cellulose. By contact the film sticks to the substrates surface and cools down.

This allows a good adhesion of the cellulose with the PHBH+PBS film. The adhesion work is of 48 mN/m on bleached chemical pulp molded cellulose. When testing for internal cohesion of the laminated molded pulp sample, the break is cohesive. This means that the break is observed on the molded cellulose and that the film still sticks to it. The film is not separated from the molded cellulose, showing that there is a good penetration of the film within the molded cellulose.

3) Thermopressing

A cellulose substrate is shaped in a mold and placed so that a film is pressed inside the substrate with a heated counter mold as shown in the FIG. 1. The molds are heated a little bit above the glass transition temperature of the film, for example to about 113° C. Film heating allows the film to be laminated and to bestretchable. The film is a PHBH+PBS film of 150 μm thickness. It is placed above the piece to be laminated Pressure of 10 000 N is then applied homogenously on the molds. After pressing the mold is opened and the piece released. The material needs then to cool down. this can be done in the mold if the structure allows it.

4) Assembling

The assembling of the laminated molded parts can be done by several means depending on the containers shape.

The first possibility is to use a glue, compatible with the lamination material. Epoxy glue is applied on both parts to be assembled, they are the then pressed against each other, hold together with clamps, allowing the glue to dry and ensure a tight seal. The glue is dried during 24 h.

Thermopressing is also a possibility. After thermopressing of the film as per the above example, the film is either still hot or needs to be slightly reheated by the means of infrared panels, for example. The temperature needed is around 113° C. Infrared panels are placed above the piece for 8 seconds while their power is set to 70%. The joints are then pressed against each other, clamps are used to help applying the right force during enough time. The clamps are removed after 1 h allowing the material to cool down. While cooling down, a tight seal is formed. To use this method, a certain film thickness is required. The film used in this example has a thickness of 150 μm.

Both sealing methods allows to get a tight seal. This means that if the container is filled with water during 24 h no leakage will be observed on the joints were the piece was assembled.

The invention claimed is:

1. A rigid biodegradable food container comprising at least one layer comprising at least one polyhydroxyalkanoate (PHA) and another layer comprising cellulosic fibres, the rigid biodegradable food container comprising an inner container comprising at least one PHA and at least one biodegradable polymer which is poly(butylene succinate) (PBS), and an outer container comprising cellulose.

2. The rigid biodegradable food container in accordance with claim 1, wherein the inner container has a wall thickness in the range of about 20 to 250 μm.

3. The rigid biodegradable food container in accordance with claim 1, wherein the inner container has a water vapor transmission rate in the range of 50 g/(m²×24 h) or below.

4. The rigid biodegradable food container in accordance with claim 1, wherein the inner container has a volume in the range of about 100 ml to 5 l.

5. The rigid biodegradable food container in accordance with claim 1, wherein the outer container comprises cellulose containing fibres.

6. The rigid biodegradable food container in accordance with claim 1, wherein the outer container has a wall thickness in the range of about 0.5 to 2 mm.

7. The rigid biodegradable food container in accordance with claim 1, wherein the inner container can be exchanged while the outer container is re-used.

8. The rigid biodegradable food container in accordance with claim 7, wherein the outer container can be opened and re-closed.

9. The rigid biodegradable food container in accordance with claim 1, wherein the inner container is laminated to the outer container.

10. The rigid biodegradable food container in accordance with claim 9, wherein the lamination is carried out by a process comprising the steps of heating the inner container in contact with the outer container and thermoforming the inner container against the outer container.

11. The rigid biodegradable food container in accordance with claim 1, wherein the inner container is spray-coated onto the outer container.

12. The rigid biodegradable food container in accordance with claim 1, wherein the outer container comprises 100% cellulose.

13. The rigid biodegradable food container in accordance with claim 1, wherein the food container is a food bottle and the neck of the food bottle comprises at least one PHA.

*    *    *    *    *